(12) United States Patent
Pestoni

(10) Patent No.: US 8,296,569 B2
(45) Date of Patent: Oct. 23, 2012

(54) CONTENT PROTECTION INTEROPERABILITY INFRASTRUCTURE

(75) Inventor: Florian Pestoni, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1589 days.

(21) Appl. No.: 11/539,840

(22) Filed: Oct. 9, 2006

(65) Prior Publication Data

US 2008/0086757 A1    Apr. 10, 2008

(51) Int. Cl.
*G06F 21/00* (2006.01)

(52) U.S. Cl. .......... 713/172; 705/51; 705/901; 705/902; 705/904; 705/908

(58) Field of Classification Search .................... 713/172
See application file for complete search history.

(56) References Cited

U.S. PATENT DOCUMENTS

| | | | |
|---|---|---|---|
| 5,293,310 A | | 3/1994 | Carroll et al. |
| 6,343,281 B1 | | 1/2002 | Kato |
| 6,931,545 B1 | | 8/2005 | Ta et al. |
| 6,996,720 B1 | | 2/2006 | DeMello et al. |
| 7,010,808 B1 * | | 3/2006 | Leung et al. ............ 726/26 |
| 7,177,841 B2 * | | 2/2007 | Inoue et al. ............ 705/51 |
| 2002/0071553 A1 | | 6/2002 | Shirai et al. |
| 2002/0107803 A1 | | 8/2002 | Lisanke et al. |
| 2002/0156712 A1 * | | 10/2002 | Rambhia ............ 705/36 |
| 2003/0021413 A1 | | 1/2003 | Kiiveri et al. |
| 2003/0120928 A1 | | 6/2003 | Cato et al. |
| 2003/0125976 A1 | | 7/2003 | Nguyen et al. |
| 2003/0149890 A1 | | 8/2003 | Shen et al. |
| 2003/0182142 A1 | | 9/2003 | Valenzuela et al. |
| 2003/0221171 A1 | | 11/2003 | Rust et al. |
| 2003/0229593 A1 * | | 12/2003 | Raley et al. ............ 705/55 |
| 2004/0054920 A1 | | 3/2004 | Wilson et al. |
| 2004/0093337 A1 | | 5/2004 | Shen et al. |
| 2004/0111613 A1 * | | 6/2004 | Shen-Orr et al. ............ 713/165 |
| 2004/0196972 A1 * | | 10/2004 | Zhu et al. ............ 380/45 |
| 2004/0236956 A1 * | | 11/2004 | Shen et al. ............ 713/193 |
| 2005/0075998 A1 * | | 4/2005 | Huang et al. ............ 707/1 |
| 2005/0169473 A1 * | | 8/2005 | Candelore ............ 380/239 |
| 2005/0182931 A1 * | | 8/2005 | Robert et al. ............ 713/168 |
| 2005/0228752 A1 * | | 10/2005 | Konetski et al. ............ 705/51 |
| 2006/0095382 A1 * | | 5/2006 | Mahlbacher ............ 705/59 |

FOREIGN PATENT DOCUMENTS

| | | |
|---|---|---|
| WO | 00/51310 | 8/2000 |
| WO | 2004/055651 A1 | 7/2004 |

OTHER PUBLICATIONS

Rouvroy et al, Reconfigurable Hardware Solutions for the Digital Rights Management of Digital Cinema, Oct. 24, 2004, Proceedings of the 4th ACM Workshop on Digital Rights Management, pp. 40-53.*

(Continued)

*Primary Examiner* — Taghi Arani
*Assistant Examiner* — Kenneth Chang
(74) *Attorney, Agent, or Firm* — Senniger Powers LLP

(57) ABSTRACT

Interoperability of protected content items between computing devices is facilitated by providing content items having a standard representation, and media players having support for the content item representations. The representation of the content item may be limited by a profile as to the elements it contains. The elements allowed in the content item may also be limited.

13 Claims, 9 Drawing Sheets

OTHER PUBLICATIONS

Reid et al, DRM, Trusted Computing and Operating System Architecture, Jan. 2005, Proceedings of the 2005 Australasian workshop on Grid computing and e-research, vol. 44, pp. 127-136.*

Kesden, Lecture 33: Content Scrambling System, Course: 15-412 Operating Systems: Design and Implementation, Dec. 6, 2000, 15 pgs.

Delgado et al., "Profiles for interoperability between MPEG-21 REL and OMA DRM," Seventh IEEE International Conference on E-Commerce Technology, 2005, CEC 2005, Jul. 19, 2005, 4 pgs., http://dmag.upf.edu/papers/jdjpercec05.pdf.

Delgado et al., "Use of the MPEG-21 Rights Expression Language for Music Distribution," 2003 IEEE, 4 pgs., http://ieeexplore.ieee.org/iel5/8731/27650/01233867.pdf?isNumber=.

Prados et al., "Interoperability between different Rights Expression Languages and Protection Mechanisms," First International Conference on Automated Production of Cross Media Content for Multi-Channel Distribution, 2005, AXMEDIS 2005, Nov. 30, 2005, 8 pgs., http://ieeexplore.ieee.org/iel5/10605/33514/01592080.pdf?isNumber=.

* cited by examiner

FIG. 8

```
XML

800

IPMPGeneralInfoDescriptor
    ToolList
        ToolDescription
            IPMPToolID or Remote
    Signature (optional)
    LicenseCollection
        RightsDescriptor
            License or LicenseReference Item
    Resource
        IPMPInfoDescriptor
            Tool (limited to one occurrence per IPMPInfoDescriptor)
                ToolRef
                InitializationSettings (optional)
                    InitializationData (required if InitializationSettings
                    present)
            Signature (optional)
```

CONTENT PROTECTION INTEROPERABILITY INFRASTRUCTURE

BACKGROUND

Content protection or digital rights management (DRM) allows content creators and content distributors to control access to content and prevent unauthorized use and piracy. Content creators often supply content, such as media content (e.g., music, pictures, and movies), to content distributors in an unprotected form (i.e., the content has no DRM or other protection scheme applied to it). Content distributors typically select and apply a DRM scheme to the content to prevent unauthorized use of the content by an end user. A DRM scheme typically includes a way to define usage conditions, generally referred to herein as a license, an encryption algorithm, and corresponding cryptographic material (e.g., decryption keys). The license defines operations that may be performed on the content, and operations that are not explicitly allowed in the license are usually assumed to be unauthorized. The encryption algorithm is used to encrypt the content as a way to enforce the license. For example, a user may download a trial version of a song that has a license allowing the user to play the song track for one week. At the end of the week, the user can no longer play the song track because a compliant implementation of a media player will refuse to play a song track with an expired license. Non-compliant implementations or other users (e.g. hackers who may intercept the download of the song) cannot access the content because they do not have the proper decryption keys (i.e., the corresponding cryptographic material).

End users increasingly download content from distributors such as iTunes, YahooMusic, and CinemaNow. These users often prefer that downloaded content will play on multiple devices (e.g., a computer, a television set top box, and a portable media player). However, in some formats, content is only compatible with certain devices.

An existing solution is to bridge content between devices. Bridging involves a first device that supports the content protection scheme of a content item (i.e., a first content protection scheme) converting the content to a second protection scheme which is supported by a second device. Converting involves decrypting the content of the content item with an encryption algorithm and cryptographic material of the first protection scheme and encrypting the content with an encryption algorithm and cryptographic material of the second protection scheme. This is known in the art as transcryption, and it may only occur if explicitly allowed in a license of the content item or implicitly allowed by a system-wide policy of the first content protection scheme. In addition, the license of the first protection scheme must be converted to a license of the second protection scheme which is referred to in the art as rights mapping. Once both content transcryption and rights mapping have occurred in accordance with applicable policies, the content can be transmitted or transferred from the first device to the second device via a network or other connection between the first and second devices (e.g., a wired or wireless home network).

Bridging has some limitations: the computational burden of transcryption and rights mapping may fall on a device that has limited processing power and/or storage capability; the device called upon to perform the transcryption and rights mapping may not be available at the time the user makes a transfer or playback request which would initiate bridging; and content distributors have limited control over the capability of devices to convert content from one content protection scheme to another.

SUMMARY

Embodiments of the invention enable interoperability of protected content items on a plurality of computing devices. The protected content item may be limited to a predetermined set of elements and may have multiple copies of its content protected with multiple content protection schemes. In one embodiment, aspects of the invention involve generating and rendering a protected content item having content encrypted by a content protection scheme. The protected content item may contain references to a location from which the content protection scheme and/or the content encrypted according to a particular content protection scheme can be retrieved. In one embodiment, a device may download support for the content protection scheme at a time other than when a user requests the device render the protected content.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 8 is an exemplary block diagram illustrating a profile for an XML document used to express data regarding protected resources in an MPEG 21 File Format.

Corresponding reference characters indicate corresponding parts throughout the drawings.

DETAILED DESCRIPTION

The MPEG 21 Digital Item specification defines an XML container structure and elements for describing a content item wherein the elements provide information about media resources identified in the container in a standardized format.

Figure 1:
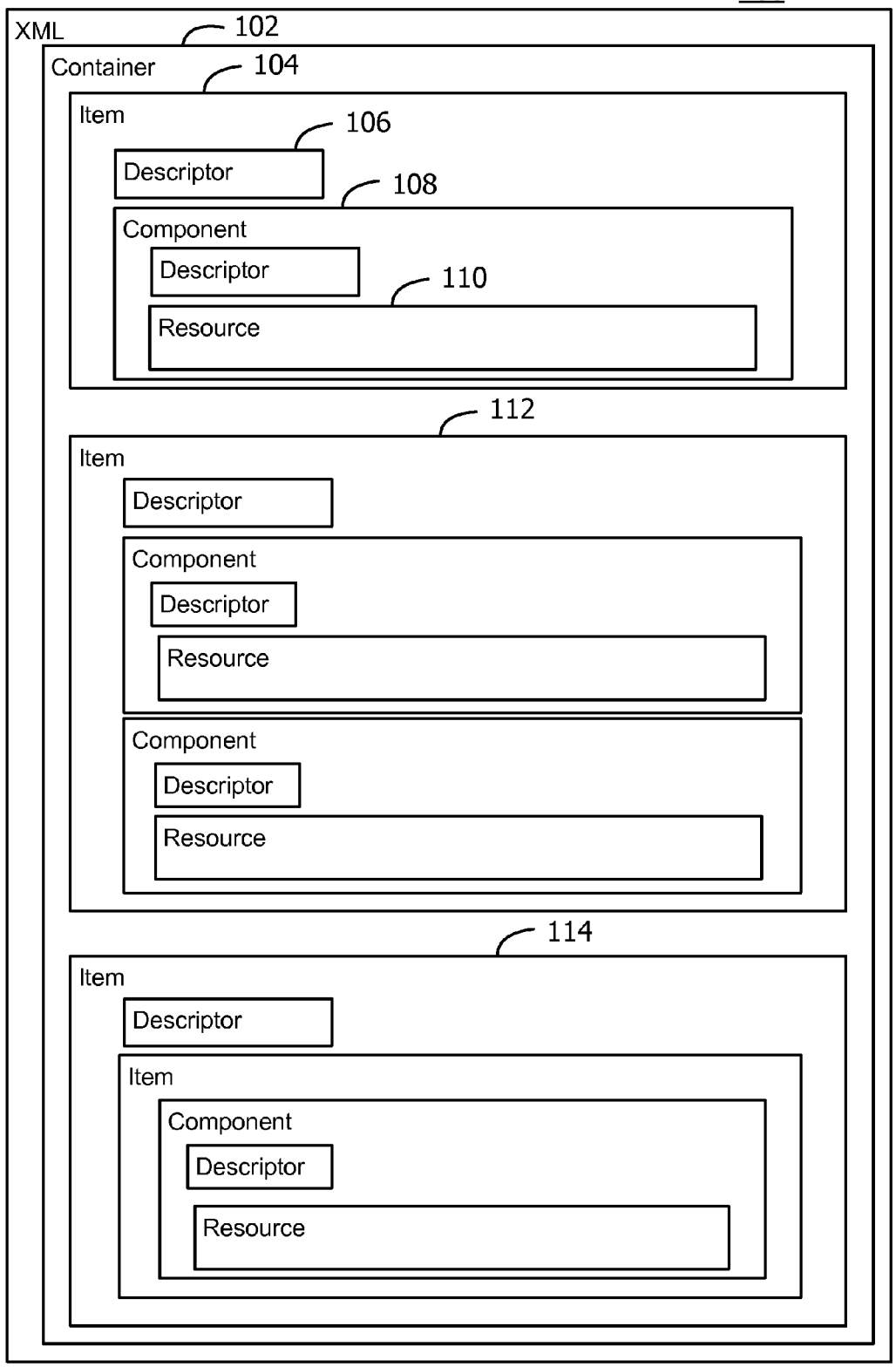
FIG. 1 is an exemplary block diagram of a content item represented as a Motion Pictures Experts Group (MPEG) Digital Item as known in the prior art.

Referring to FIG. 1, an exemplary block diagram of a content item represented as a Motion Pictures Experts Group (MPEG) Digital Item is shown as known in the prior art. A content item may have any format (e.g., a container, a file, and a bitstream) and contain any content (e.g., a movie, a plurality of movies, a video clip, a plurality of video clips, a picture, a plurality of pictures, any combination of the above, or any other form of digital content).In the illustrated example, the Digital Item 100 comprises a Container 102 having one or more Items, such as Item 104. Each Item may contain a Descriptor, such as Descriptor 106, as well as one or more Components, such as Component 108. In turn, each Component may have a Descriptor and a Resource element, such as Resource element 110, that may be used to embed or reference media content. An Item may contain multiple Components, as illustrated in Item 1 12, or an Item may contain another Item, as illustrated in Item 114. The Digital Item 100 is for illustrative purposes only.

The MPEG-21 IPMP Components (ISO/IEC 21000-4) standard provides management and protection of intellectual property in the ISO/IEC 21000 MPEG-21 multimedia framework over heterogeneous access and delivery infrastructures. MPEG-21 IPMP Components standard represents a flexible and extensible framework for applying protection mechanisms to a Digital Item (e.g. a digital item having the MPEG-21 format). The MPEG-21 Components standard purposely does not specify protection measures, keys, key management, trust management, encryption algorithms, certification infrastructures or other components so that it can be adapted for use with a plurality of systems.

The MPEG 21 IPMP Components specification is designed to be applicable to a wide range of application areas. In one embodiment, the present invention enhances the utility of this standard by identifying and developing specific profiles supporting various content distribution and consumption models. A profile is a subset of components or elements of a specification, wherein some elements of the profile are selected and others may be restricted from the larger specification in order to improve interoperability. In one embodiment of the invention, a profile supports commercial content distribution.

Figure 2:
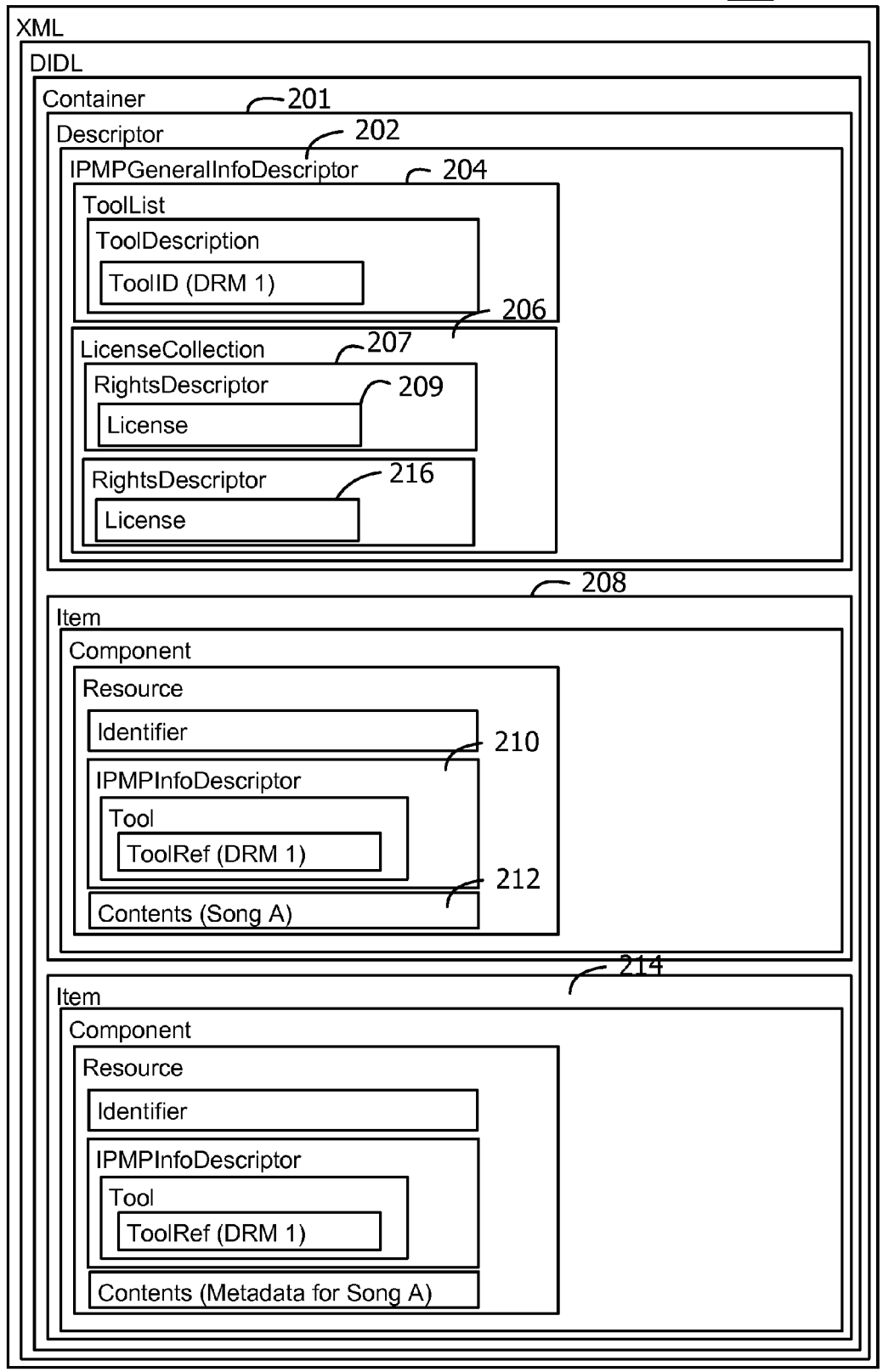
FIG. 2 is a block diagram illustrating a profile for representing protected content with MPEG-21 Intellectual Property Management and Protection (IPMP) Components according to one embodiment of the invention.

Referring to FIG. 2, an exemplary block diagram of a protected content item compatible with a plurality of computing devices is shown according to one embodiment of the invention. In FIG. 2, a protected content item 200 is represented as an MPEG-21 Digital Item with MPEG 21 Intellectual Property Management and Protection (IPMP) Components signaling the protection mechanisms that have been applied. The Digital Item 200 in FIG. 2 has a similar structure to the Digital Item 100 of FIG. 1. A Descriptor element 201 has an IPMPGeneralInfoDescriptor 202 which conveys information about the protection schemes that are used in the Digital Item 200. The IPMPGeneralInfoDescriptor 202 contains a ToolList 204 and a LicenseCollection 206. The ToolList 204 includes information about a single protection tool (in the example DRM 1) that is used to protect resources in this Digital Item 200. The LicenseCollection 206 may include one or more Licenses, such as License 209, packaged within corresponding RightsDescriptors, such as RightsDescriptor 207.

The exemplary Digital Item 200 contains two Items 208 and 214. Each Item contains a protected Resource, and all Resources are protected using the same Tool, in this case DRM 1. Item 208 includes a Resource with a corresponding Identifier (which allows linking to the corresponding License in LicenseCollection 206), an IPMPInfoDescriptor such as IPMPInfoDescriptor 210 (which includes a reference to the Tool defined in ToolList 204), and the protected Contents, such as Song A 212. Item 214 represents another Resource within the same Digital Item 200, has a different License 216.

A Digital Item such as Digital Item 200 may also have unprotected resources. For instance, in the case of a music content item, the music track (in the example, Song A) may be protected and the license corresponding to the music track may specify a limited number of playbacks are allowed; metadata (in the example, metadata for Song A) such as album cover art and lyrics may be protected with unlimited viewing allowed in a corresponding license; and basic information including artist and song title may be left unprotected (not shown in FIG. 2). Furthermore, some of the elements outlined above are optional. For example, some protection tools include their own mechanisms for conveying usage rights, in which case the License may be omitted from the Digital Item 200. Other embodiments of the invention may vary in the number of resources in an item and the number of items in a protected content item. For example, a protected content item may contain an entire music album consisting of 10 songs. One format for the protected content item would be an MPEG 21 Digital Item having 10 items protected resources and a second item having unprotected resources representing metadata and album art.

Figure 3:
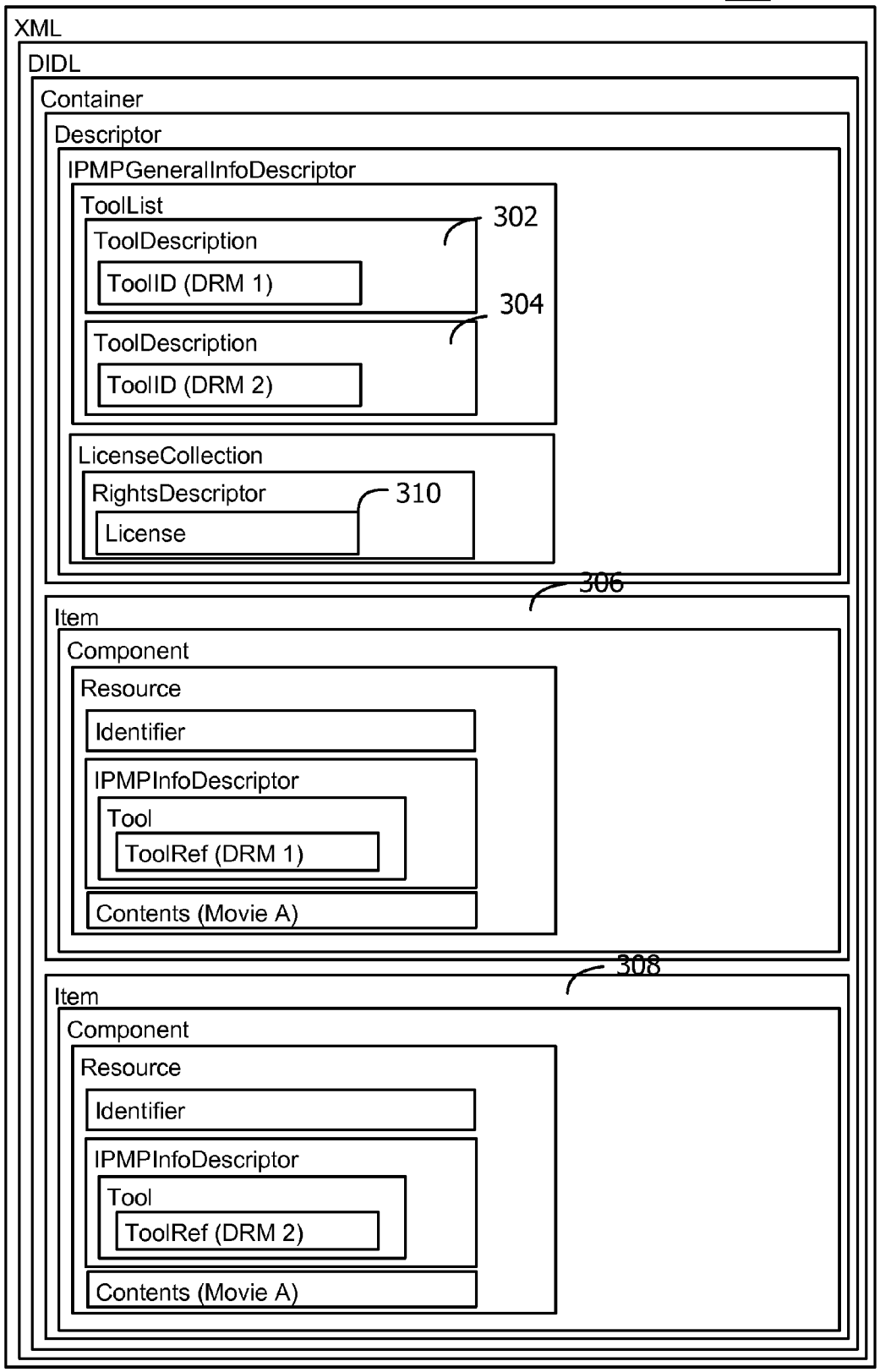
FIG. 3 is a block diagram illustrating a profile for representing a resource protected with multiple protection schemes with MPEG-21 IPMP Components.

Referring to FIG. 3, another embodiment of the invention applying multiple protection schemes in one Digital Item is shown. The Digital Item 300 contains references to two different content protection Tools 302 and 304. Two Items 306 and 308 are included in the Digital Item 300. Each Item contains a Resource protected by the corresponding Tools 302 and 304. However, both protected Resources correspond to the same unprotected resource. That is, both protected Resources represent a digital encoding of a movie (in the example, Movie A). Movie A is protected with DRM 1 in Item 306 and with DRM 2 in Item 308. In this example, the same License 310 applies to both Items 306 and 308. Thus, a playback device or media player that supports either DRM 1 or DRM 2 (or both) will be able to play back the content in accordance with the license 310. This allows a degree of interoperability that can be controlled by content distributors. The protected Resources may be included inline as part of the Digital Item 300. Alternatively, the Resource elements in the Digital Item 300 may provide a reference to a location (e.g. on the same storage medium or at a network-accessible remote location such as a uniform resource locator on the Internet) where the actual protected Resource may be retrieved at the time of playback.

Figure 4:
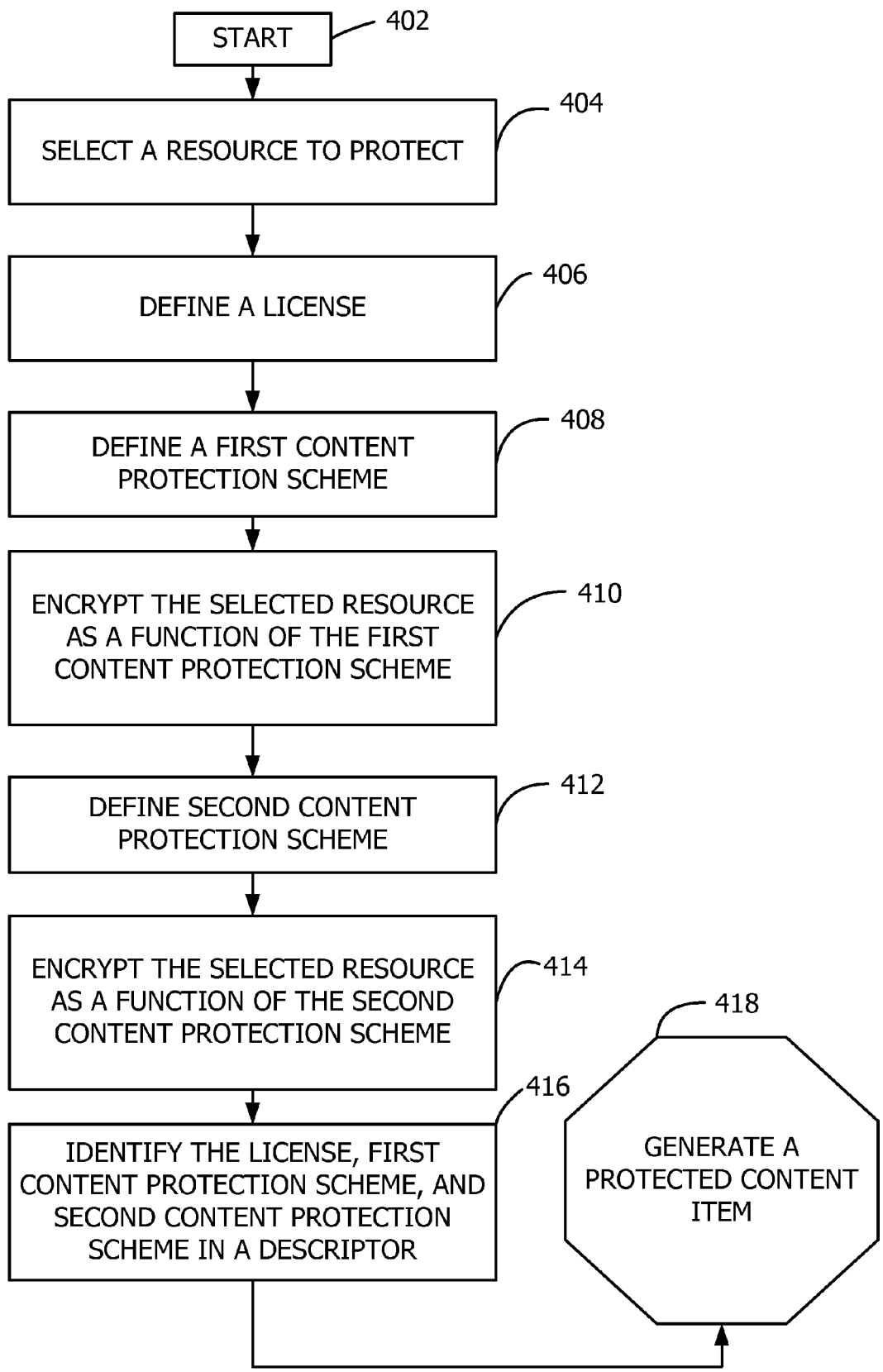
FIG. 4 is an exemplary flow chart illustrating operation of a method for generating a content item compatible with a plurality of computing devices.

Referring to FIG. 4, a method for generating a protected content item compatible with a plurality of computing devices is shown according to one embodiment of the invention. The protected content item may have any number of items, and any number of protected and unprotected resources. In this example, one resource of one item is protected using two different content protection schemes. The method begins at 402. At 404, a resource of an item is selected for protection. At 406, a license is defined for the selected resource, and at 408, a first content protection scheme is defined for the selected resource. At 410, the selected resource is encrypted as a function of the first content protection scheme resulting in a first protected resource. At 412, a second content protection scheme is defined for the selected resource and the selected resource is encrypted as a function of the second content protection scheme at 414 resulting in a second protected resource. At 416, the first and second content protection schemes and the license are identified in a descriptor. At 418, a protected content item is generated containing the first and second protected resources and the descriptor. This embodiment of the invention results in a single protected content item having one resource encrypted two different ways. The two content protection schemes may be fundamentally different (e.g., encrypt the content in different ways) or may vary only by the key system they utilize.

Figure 5:
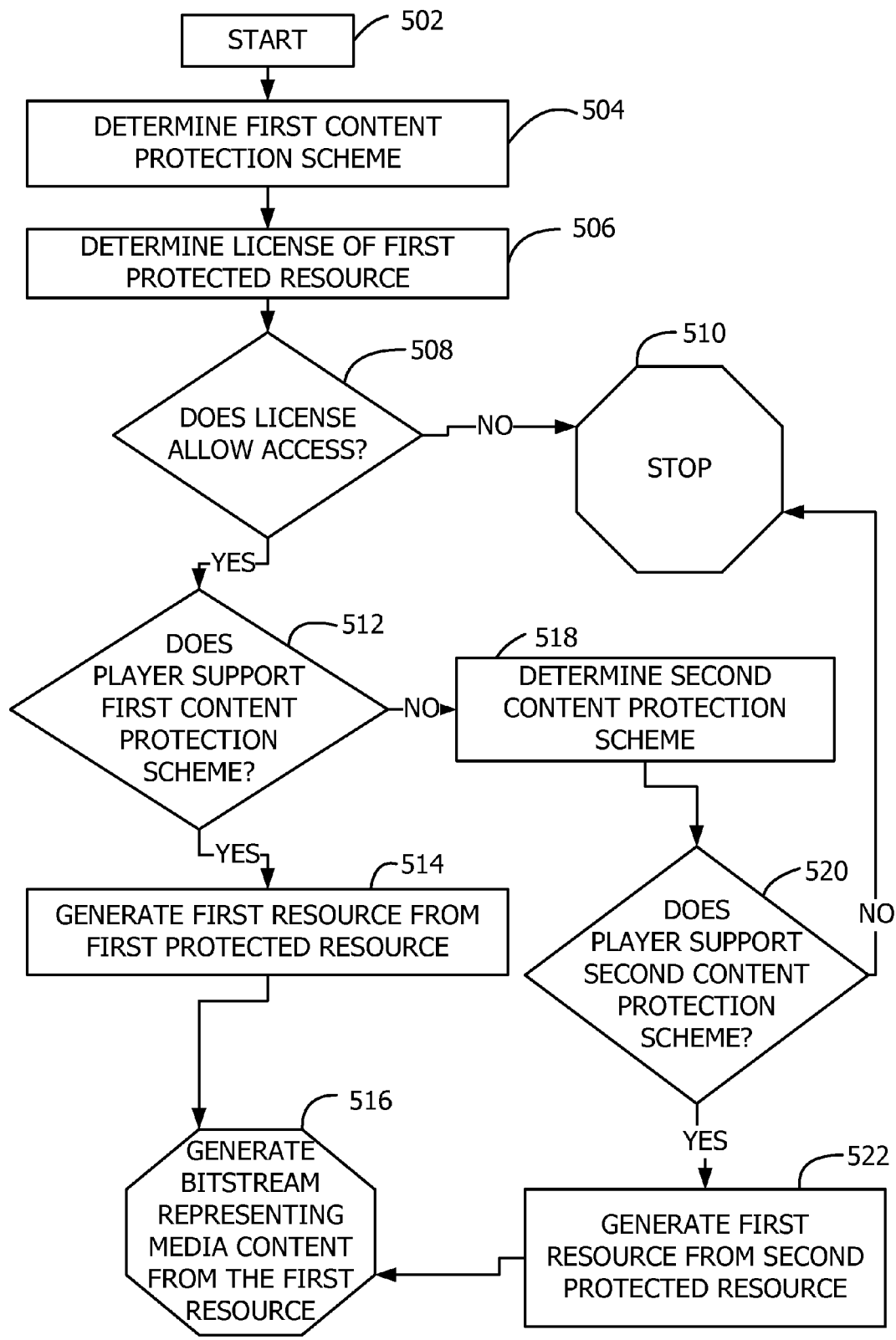
FIG. 5 is an exemplary flow chart illustrating operation of a method for rendering content stored in a content item having protected resources.

Referring now to FIG. 5, a flow chart illustrating usage of a protected content item is shown according to one embodiment of the invention. The method begins at 502, and at 504, the protected content item is examined to determine the first content protection scheme associated with the first protected resource. At 506, the protected content item is examined to determine a license associated with the first protected resource. At 508, it is determined whether the license allows access to the first protected resource. If the license does not allow access, then the processing is stopped at 510. If the license allows access, then it is determined whether the media player supports the first content protection scheme at 512. If the player supports the first content protection scheme, then it accesses the first protected resource by decrypting the first protected resource as a function of the first content protection scheme at 514, and at 516, it generates a bitstream representing the media content of the first protected resource.

If the player does not support the first content protection scheme, then a second content protection scheme of the first protected resource is determined at 518. At 520, the player determines whether the second content protection scheme is supported. If the player does not support the second content protection scheme, then the process is ended at 510. If the player supports the second content protection scheme, then it accesses the second protected resource at 522, and generates a bitstream representing the media content from the first resource.

If a content protection scheme in a protected content item is not supported by a media player, the media player may acquire support for the content protection scheme at a time other than when a user identifies the protected content item for rendering, such as when the content item is received by the media player. Also, a resource may be a representation of media content or a reference to a location (i.e., hyperlink) to the content.

Figure 6:
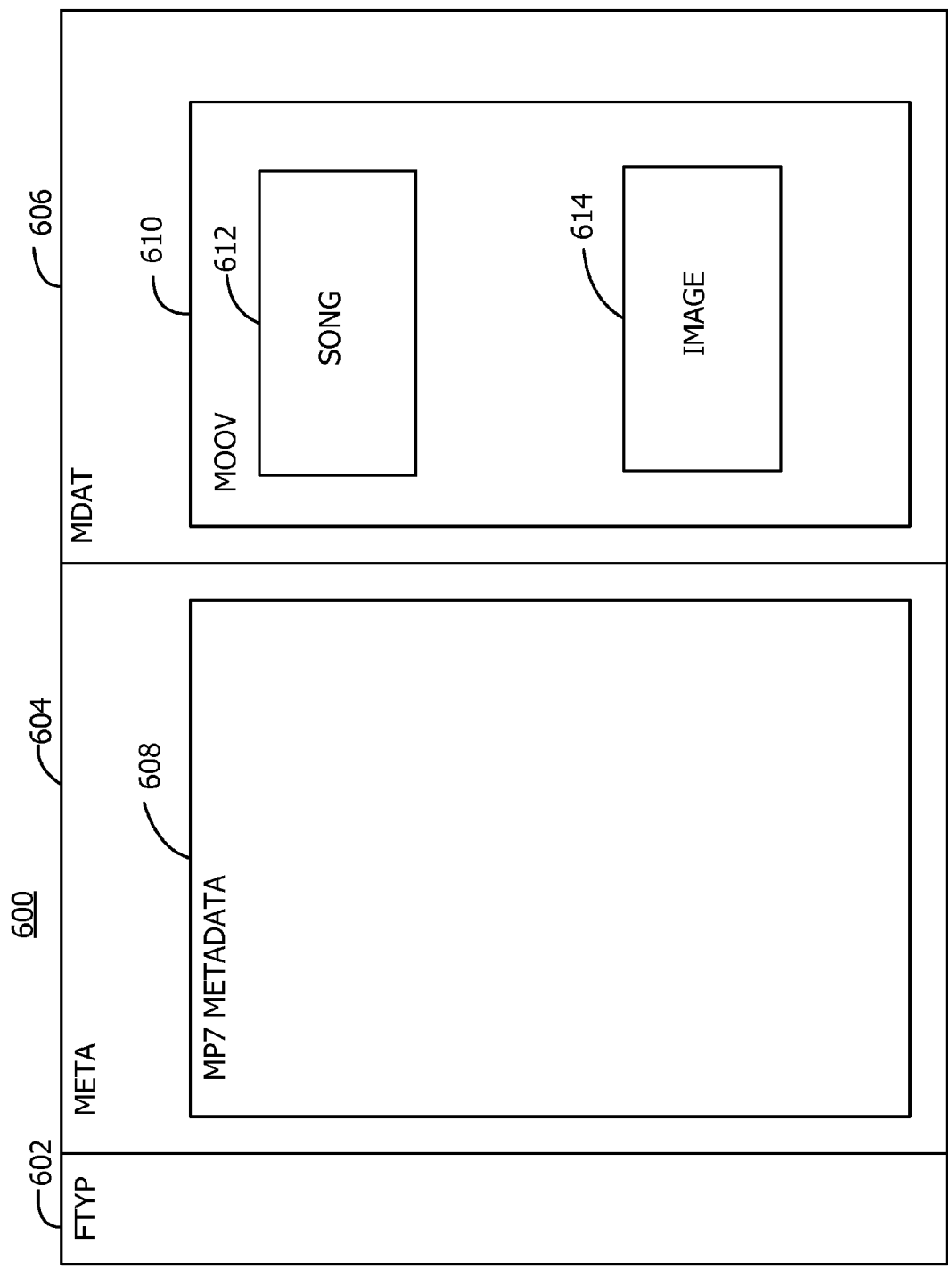
FIG. 6 is an exemplary block diagram of a music content item having a Motion Pictures Experts Group (MPEG) 21 File Format.

Referring to FIG. 6, an exemplary block diagram of a music content item in an MPEG 21 File Format is shown. A content item may be any format for containing content including a container, a file, or a bitstream. The MPEG 4 file format and MPEG 7 metadata format, for example, define an XML container structure and elements for describing a content item wherein the elements provide information about the content item's contents in a standardized format. In the illustrated example, the content item 600 has a file type identifier (i.e., FTYP 602), a metadata portion (i.e., META 604), and a data portion (i.e., MDAT 606). The metadata portion 604 contains a metadata document (i.e., MP7 METADATA 608). The metadata document 608 in this example is an extensible markup language (XML) document having an MPEG 7 format. The metadata document 608 may contain information such as the title of the song, the title of an album associated with the song, the copyright date of the song, the name of the artist, etc. The data portion 606 of the content item has an item 610, labeled MOOV, that encapsulates resources such as a song 612 and an image 614 or any other form of digital content. For example, the image 614 may be the cover of an album associated with the song 612. The content item 600 is for illustrative purposes only. A content item for use with the invention may have any format and contain any content (e.g., a movie, a plurality of movies, a video clip, a plurality of video clips, a picture, a plurality of pictures, any combination of the above, or any other form of digital content).

Figure 7:
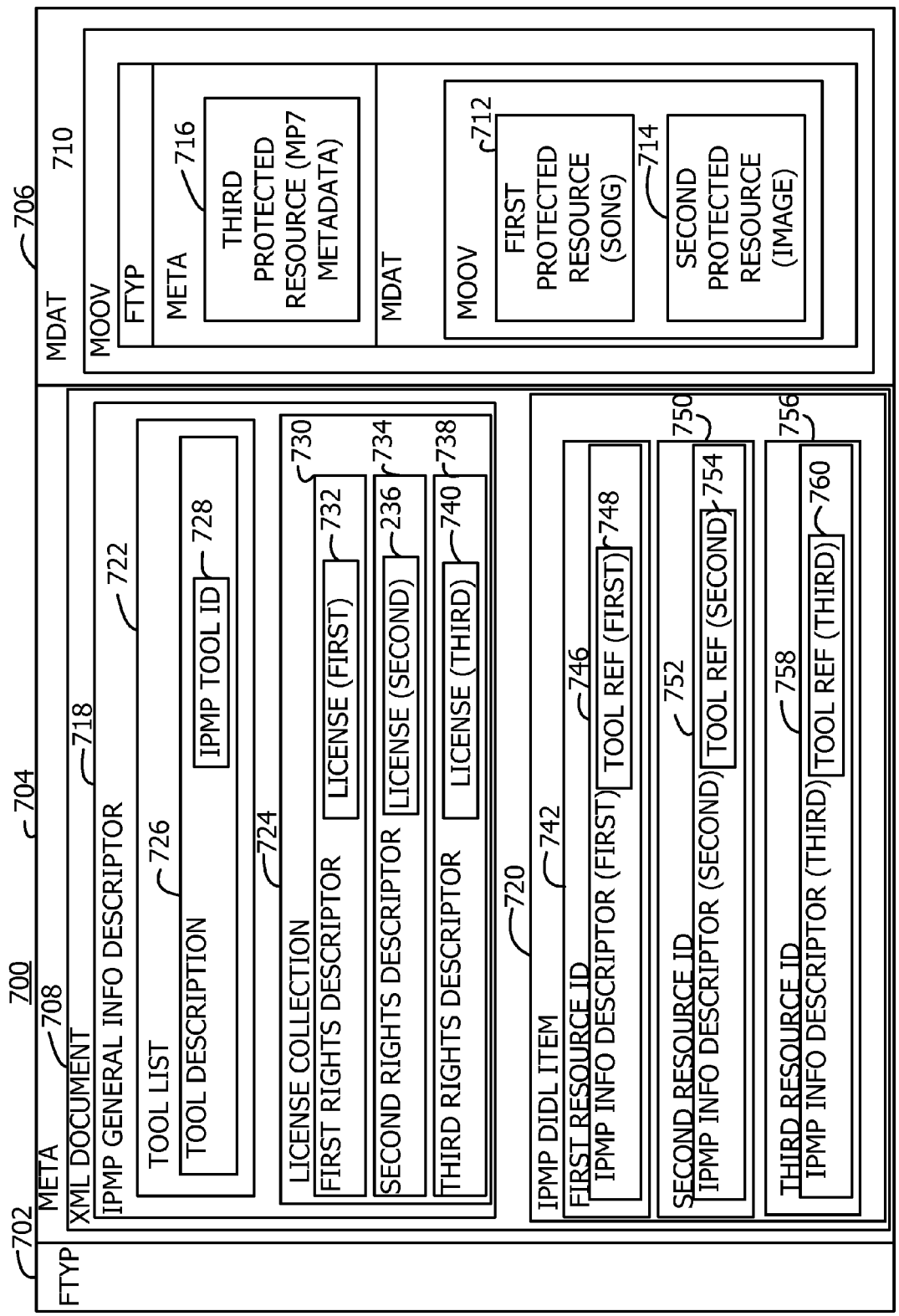
FIG. 7 is an exemplary block diagram illustrating the music content item of FIG. 6 encapsulated and protected in a content item having an MPEG 21 File Format.

Referring to FIG. 7, an exemplary block diagram of a content item compatible with a plurality of computing devices is shown according to one embodiment of the invention. In FIG. 7, a protected content item 700 having the MPEG 21 File Format is shown. A protected content item is a content item having at least one protected resource. The protected content item 700 encapsulates the music content item 600 of FIG. 6 using a profile (i.e., a reduced set of the elements available for a given content item format; a subset of MPEG 21 IPMP Components in this example). The resources (i.e., MP7 METADATA 608, song 612, and image 614) of the music content item 600 have been protected with a content protection scheme (e.g., a DRM scheme). The protected content item 700 has a file type portion (i.e., FTYP 702), a metadata portion (i.e., META 704), and a data portion (i.e., MDAT 706). The metadata portion 704 in this exemplary diagram contains an XML document 708, and the data portion 706 contains an item 710, labeled MOOV in this example. The music content item 600 is encapsulated in the MOOV item 710 of the protected content item 700. However, the resources of the music content item 600 have been encrypted as a function of a content protection scheme. It is not necessary to encrypt all of the resources of a given content item. For example, a content distributor may wish to leave the MP7 metadata 608 and image 614 unprotected so that a user can access this content without owning a license for the song 612. In the protected content item 700, a first protected resource 712 represents the song 612, a second protected resource 714 represents the image 614, and a third protected resource 716 represents the MP7 METADATA 608.

Information for decoding the protected resources (i.e., the first protected resource 712, the second protected resource 714, and the third protected resource 716) is contained in the XML document 708. The XML document 708 contains a descriptor (shown as IPMP General Info Descriptor 718 in FIG. 7) for identifying content protection schemes and licenses used in the protected content item 700. The XML document 708 also contains a digital item description (shown as IPMP DIDL ITEM 720 in FIG. 7) for identifying the resources in the protected content item 700 and relating a content protection scheme and license identified in the descriptor 718 to protected resources. In the example in FIG. 7, the descriptor 718 has a list of tools (shown as Tool List 722) for identifying content protection schemes used in the protected content item 700, and a collection of licenses (shown as License Collection 724 in FIG. 7) for identifying licenses of resources in the protected content item 700. The Tool List 722 has a tool description (shown as Tool Description 726) for each content protection scheme of the protected content item 700. In the present example, all of the resources are encrypted with the same content protection scheme, so there is one Tool Description 726. The Tool Description 726 has a tool identification (shown as IPMP Tool ID 728) for identifying the content protection scheme. The License Collection 724 has a description of rights (shown as Rights Descriptors) for every unique license used in the protected content item 700.

Those skilled in the art are familiar with MPEG 21 IPMP Component elements including: IPMPGeneralInfoDescriptor, ipmpinfo:ToolList, ipmpinfo:ToolDescription, ipmpinfo:IPMPToolID, ipmpinfo:MemberOf, ipmpinfo:AlternateGroup, ipmpinfo:Inline, ipmpinfo:Remote, ipmpinfo:ConfigurationSettings, dsig:Signature, ds:SignedInfo, ds:SignatureValue, ds:KeyInfo, ds:Object, IPMPInfoDescriptor, ipmpinfo:Tool, ipmpinfo:ToolBaseDescription, ipmpinfo:IPMPToolID, ipmpinfo:Jnline, ipmpinfo:Binary, ipmpinfo:Remote, ipmpinfoConfigurationSettings, ipmpinfo:ToolRef, ipmpinfo:InitializationSettings, ipmpinfo:InitializationData, ipmpinfo:RightsDescriptor, ipmpinfo:License, ipmpinfo:LicenseReference, and ipmpinfo:LicenseService. MPEG 21 IPMP Components elements are used to create a standard content item format extendable for use with most forms of content, regardless of the number of digital items and resources, or the method by which DRM and licensing is handled. It is to be understood that the use of elements of the MPEG 21 Multimedia Framework are merely exemplary and that other content item formats and elements or components may be used without deviating from the scope of the invention.

In this example, there are three Rights Descriptor elements indicating that the constraints on each protected resource are unique. A first Rights Descriptor 730 has a first license element 732 for defining a first set of allowed operations. The allowed operations may be limited in any way by the license element such as time limits and actions (e.g. modifying the protected resource). A second Rights Descriptor 734 has a second license element 736 for defining a second set of allowed operations, and a third Rights Descriptor 738 has a third license element 740 for defining a third set of allowed operations.

The digital item descriptor 720 (i.e., IPMP DIDL Item) lists all resources in the protected content item 700 and relates each protected resource with a content protection scheme and license identified in the descriptor 718. Other embodiments of the invention may vary in the number of resources in an item and the number of items in a protected content item. For example, a protected content item may contain an entire music album consisting of 10 songs. One format for the protected content item would be an MPEG 21 multimedia framework file having 10 items, each item consisting of three resources: metadata, song, and album cover.

FIG. 7 illustrates one content item having three resources. Each resource has a corresponding identifier. For example, the first protected resource 712 has a corresponding first Resource ID 742 for identifying the first protected resource 712 in the protected content item 700. The first Resource ID 742 has a resource descriptor (i.e., IPMP Info Descriptor 746) for identifying the license and tool (i.e., content protection scheme) for use with the first protected resource 712. The content protection scheme of the first protected resource 712 is identified in a first tool reference 748. The second Resource ID 750 has a resource descriptor (i.e., IPMP Info Descriptor 752) for identifying the license and tool (i.e., content protection scheme) for use with the second protected resource 714. The content protection scheme of the second protected resource 714 is identified in a second tool reference 754. The third Resource ID 756 has a resource descriptor (i.e., IPMP Info Descriptor 758) for identifying the license and tool (i.e., content protection scheme) for use with the third protected resource 716. The content protection scheme of the third protected resource 716 is identified in a third tool reference 760. In the instant example, all of the tool references refer to Tool Description 726 because all of the protected resources are encrypted as a function of the same content protection scheme.

FIG. 8 is a block diagram illustrating one example of a profile according to one embodiment of the present invention. The exemplary profile 800 of FIG. 8 is a restricted subset of the elements of the MPEG 21 IPMP Component standard. By restricting the elements allowed in a protected content item, computing devices for rendering protected content in the content item require less processing capability and memory. Thus, a protected content item having such a profile may be compatible with a wider array of computing devices. The example profile 800 in FIG. 8 is a restriction to the elements of the XML document (e.g. XML document 708 or XML METADATA 608) of a protected content item having MPEG 21 IPMP Components. A descriptor such as IPMPGeneralInfoDescriptor is limited to one ToolList. The ToolList has a ToolDescription element that identifies a tool used in an associated protected content item by either a unique identifier (i.e., IPMPToolID) or a reference to a full description of the tool (i.e., a link represented by the element REMOTE). The descriptor may optionally be signed using the dsig: Signature elements of the MPEG 21 IPMP Component standard. A collection of licenses is required and contains a RightsDescriptor for each unique license. The RightsDescriptor identifies a license directly through the use of an element such as License or refers to a location for a full description of a license through an element such as LicenseReference.

Identifying the contents of the protected content item associated with the profile 800 is limited to an item element, such as IPMP DIDL Item, and a resource element for listing the resources of each element. The resource element is limited to one instance of IPMP Info Descriptor and each IPMP Info Descriptor is limited to one instance of Tool. This ensures that each resource can only be encrypted as a function of a single tool or content protection scheme. Each Tool element has a reference to the tool used on the resource and an optional initial tool settings element such as InitializationSettings. If the InitializationSettings element is present, then initial data is required such as provided by InitializationData. The IPMP Info Descriptor element may optionally be signed using the dsig:Signature element of the MPEG 21 Components standard. In order to reduce the complexity of content items employing the profile 800, only the IPMPGeneralInfoDescriptor element and IPMPInfoDescriptor elements may be signed. It is redundant to sign child elements if the parent element has been authenticated via a signature.

Figure 9:
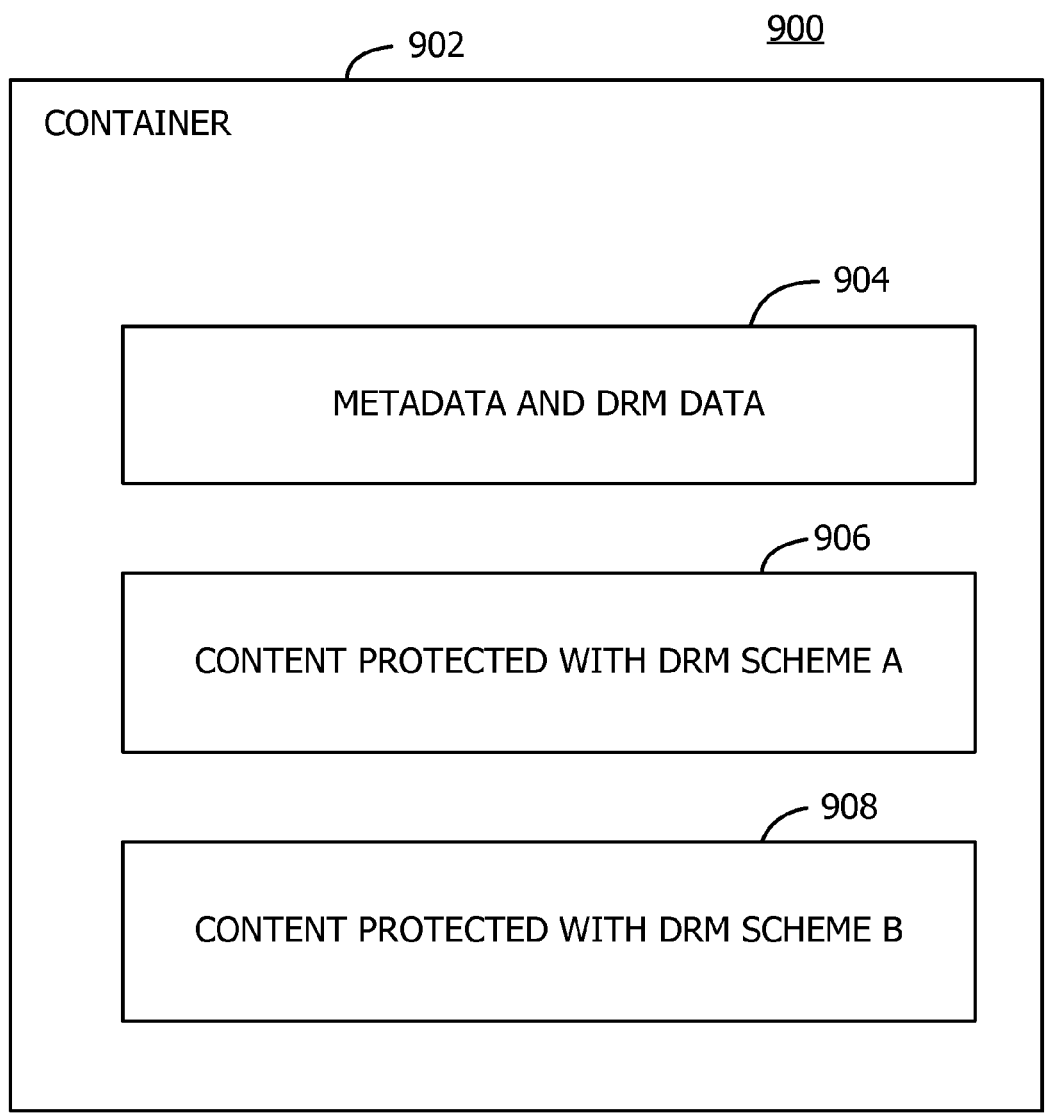
FIG. 9 is an exemplary block diagram illustrating a container having content encrypted with a plurality of content protection schemes.

FIG. 9 illustrates an alternative embodiment of the invention wherein a single piece of content is protected using a plurality of different content protection schemes. For simplicity, two content protection schemes, namely, DRM scheme A and DRM scheme B, are shown in Digital Item 900. Both protected representations of the content are stored in a single content item or container 902. The container 902 holds three main components in the illustrated embodiment: metadata and governance data 904, the content protected with DRM scheme A 906, and the content protected with DRM scheme B 908. The metadata and governance data 904 has information (i.e., metadata) relating to the protected content and governance information relating to the DRM schemes. The governance information includes, for example, a license and identifiers or other references relating to DRM schemes A and B. DRM schemes A and B are merely exemplary and may be any content protection scheme without deviating from the scope of the invention.

This embodiment of the invention facilitates interoperability of content between multiple devices because a single container, such as Digital Item 900, supports multiple content protection schemes, including content protection schemes having different encryption methods. For example, a digital versatile disc (DVD) player and a media player application on a computer generally support different encryption schemes. If, however, a video is encoded in each of the two encryption schemes supported by the two players and placed in a single container according to aspects of the invention, then both the DVD player and the media player application can render the video from the same protected content item.

In operation, a computing device executes computer-executable instructions such as those illustrated in the figures to implement aspects of the invention.

In one embodiment of the invention, a computer is suitable for use with the figures illustrated and described herein. The computer has one or more processors or processing units and a system memory. A system bus couples various system components including the system memory to the processors. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically has at least some form of computer readable media. Computer readable media, which include both volatile and nonvolatile media, removable and non-removable media, may be any available medium that may be accessed by the computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, portable media players, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of generating a protected content item for processing by a plurality of computing devices, said method comprising:

defining, in a license, one or more operations that a computing device is authorized to perform on a resource;

defining, corresponding to the license, a first content protection scheme and a second content protection scheme for permitting the defined one or more operations on the resource and for preventing other operations on the resource, wherein the second content protection scheme is different from the first content protection scheme;

generating a first encrypted resource by encoding the resource as a function of the first content protection scheme and generating a second encrypted resource by encoding the resource as a function of the second content protection scheme;

providing the license in a descriptor;

identifying the first content protection scheme and the second content protection scheme in the descriptor; and specifying a digital item description in the descriptor, said digital item description relating:

the first content protection scheme and the license to the first protected resource; and the second content protection scheme and the license to the second protected resource;

defining a profile for generating a protected content item, said profile including a restricted set of elements to be contained in the protected content item relative to the set of elements available in a content item format associated with the protected content item; and generating the protected content item as a single schema container for transfer to one or more of the plurality of computing devices, said schema container containing the first encrypted resource as a first item, the second encrypted resource as a second item, and the descriptor as a schema document, wherein the license is applicable for permitting rendering of the first encrypted resource and rendering of the second encrypted resource.

2. The method of claim 1 wherein identifying the first content protection scheme comprises storing an identifier representative of the first content protection scheme in the descriptor.

3. The method of claim 1 wherein identifying the first content protection scheme comprises storing a reference to a source providing the first content protection scheme.

4. The method of claim 1 wherein the profile comprises the descriptor, and wherein the descriptor comprises:
exactly one list of tools having a tool description, said tool description comprising either a tool identification or a reference to a source defining the tool; and
exactly one collection of licenses having a description of rights, said description of rights being limited to either a license definition or a reference to a source defining a license.

5. The method of claim 4 wherein the profile allows signatures only for the descriptor and the digital item description.

6. A computer readable memory having stored thereon a schema container representing a single protected content item having a first protected resource and a second protected resource, wherein the single protected content item is compatible with a plurality of rendering devices, said schema container comprising:
a content item type for identifying a content item format of the content item;
a metadata portion implemented as a schema document for:
identifying a license associated with the first protected resource and the second protected resource of the protected content item, said license specifying operations that the plurality of rendering devices are authorized to perform on the protected content item;
identifying a first content protection scheme and a second content protection scheme for permitting operations authorized by the license and for preventing operations not authorized by the license, wherein the second content protection scheme is different from the first content protection scheme;
relating the first content protection scheme and the license to the first protected resource;
relating the second content protection scheme and the license to the second protected resource; and
identifying a first location of the first protected resource and a second location of the second protected resource; and
a data portion for containing the first protected resource and the second protected resource, said first protected resource comprising the protected content item encrypted as a function of the first content protection scheme and the second protected resource comprising the protected content item encrypted as a function of the second content protection scheme identified in the metadata portion, wherein the protected content item has one or more elements that are restricted as a function of a profile, said profile defining a restricted set of elements to be contained in the protected content item relative to a set of elements available for the content item format associated with the protected content item.

7. The computer readable memory of claim 6 wherein the metadata portion identifies the first content protection scheme by storing at least one of the following: an identifier representative of the first content protection scheme and a reference to a source defining the first content protection scheme.

8. The computer readable memory of claim 6 wherein said restricted set of elements is selected to enable compatibility of the protected content item with the plurality of rendering devices.

9. The computer readable memory of claim 8 wherein the profile comprises a descriptor comprising:
exactly one list of tools having a tool description, said tool description comprising either a tool identification or a reference to a source defining the tool; and
exactly one collection of licenses having a description of rights, said description of rights being limited to either a license definition or a reference to a source defining a license.

10. The computer readable memory of claim 9 wherein the profile allows signatures only for the descriptor and the digital item description.

11. The computer readable memory of claim 6 wherein the protected content item comprises digital media content.

12. A method of processing a protected content item, said protected content item implemented as a single schema container, said schema container comprising a protected representation of a media content at a media player, said protected content item having a schema document storing a descriptor, a first protected resource representative of the media content, and a second protected resource different from the first protected resource and representative of the media content, said descriptor identifying a license associated therewith for permitting rendering of the first protected resource and the second protected resource, said descriptor relating the license and the first protection scheme to the first protected resource, said descriptor further relating the license and the second protection scheme to the second protected resource, said method comprising:
determining, from the descriptor, the license and a content protection scheme corresponding to each of the first protected resource and the second protected resource;
determining, from the license identified in the descriptor, one or more operations that the media player is authorized to perform on the media content;
selecting one of the first protected resource and the second protected resource as a function of the authorized operations and further as a function of compatibility of the media player with the determined content protection scheme of either the first protected resource or the second protected resource, or both; and
permitting an operation on the selected protected resource, wherein said permitting comprises:
decrypting the selected protected resource as a function of the determined content protection scheme of the selected protected resource; and
generating a bitstream from the decrypted selected protected resource, said bitstream comprising an unprotected representation of the media content.

13. The method of claim 12 further comprising acquiring support for the determined content protection scheme of the selected protected resource at a time other than when the media content is queued for rendering.

* * * * *

UNITED STATES PATENT AND TRADEMARK OFFICE
CERTIFICATE OF CORRECTION

| | | |
|---|---|---|
| PATENT NO. | : 8,296,569 B2 | Page 1 of 1 |
| APPLICATION NO. | : 11/539840 | |
| DATED | : October 23, 2012 | |
| INVENTOR(S) | : Pestoni | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1659 days.

Signed and Sealed this
Eighteenth Day of November, 2014

Michelle K. Lee
*Deputy Director of the United States Patent and Trademark Office*